Nov. 15, 1960   A. CERVINKA   2,960,211
AUTOMATIC MOULD CARRIERS
Filed Sept. 15, 1958   5 Sheets-Sheet 1

Inventor
A. Cervinka
By Ellsworth Downing Leebold
Attys.

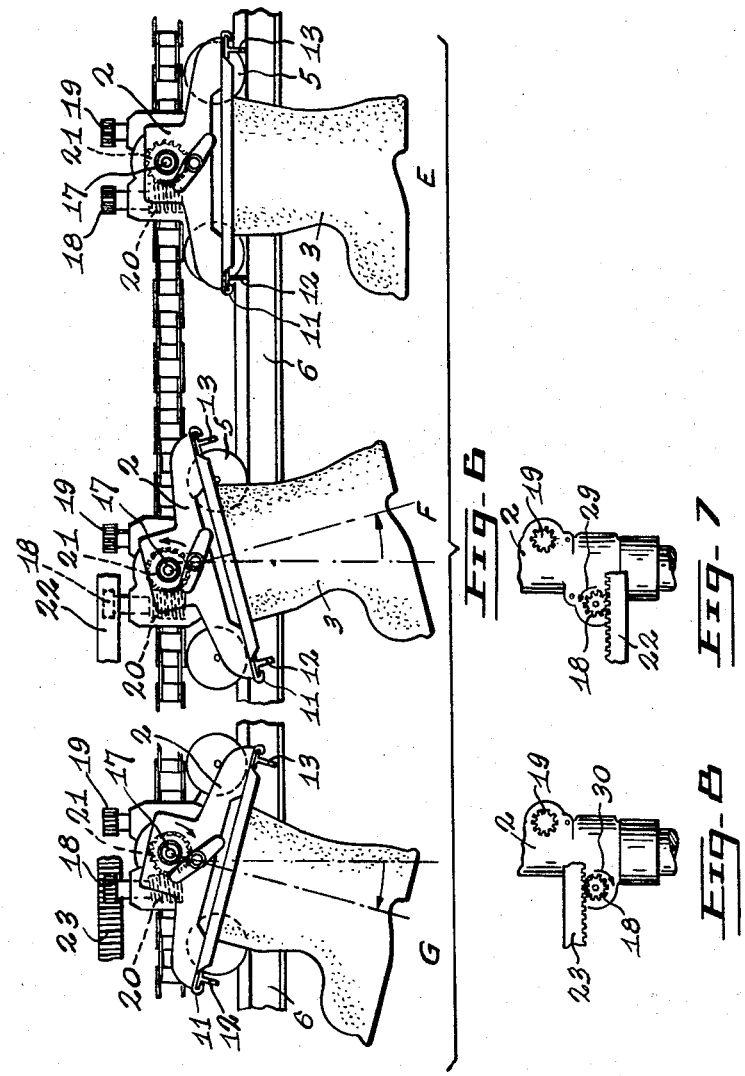

Nov. 15, 1960 A. CERVINKA 2,960,211
AUTOMATIC MOULD CARRIERS
Filed Sept. 15, 1958 5 Sheets-Sheet 5
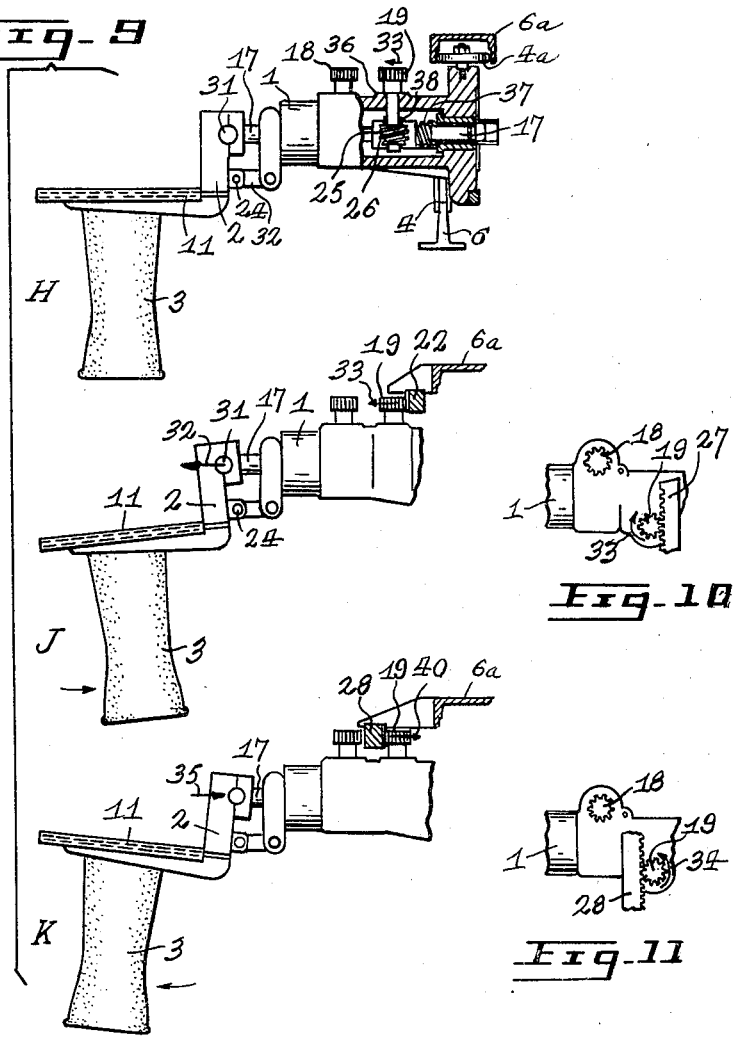
Inventor
A. Cervinka
By Glascox Downing Seebold,
Atty s.

United States Patent Office 2,960,211
Patented Nov. 15, 1960

2,960,211

AUTOMATIC MOULD CARRIERS

Anthony Cervinka, Batawa, Ontario, Canada, assignor to Bata Shoe Company of Canada Limited, Batawa, Ontario, Canada Filed Sept. 15, 1958, Ser. No. 761,179

Claims priority, application Canada Feb. 5, 1958

9 Claims. (Cl. 198—177)

The present invention relates to an automatic mould carrier for use in a slush moulding process.

In a slush moulding process hollow metallic moulds are filled with a gelable liquid mould material and then externally heated by heating lamps or elements. This heating causes a layer of the mould material next the mould wall to gel. The portion of the mould material still in the liquid state is then drained from the mould and the mould heated further to fuse a gelled layer or skin. After cooling the fused layer is stripped from the mould as a tough, flexible moulded article.

In the past the moulds were transported manually or on belt conveyors in an upright position and the various operations necessary were performed manually.

It is an object of the present invention to provide means for automatically carrying moulds through the various steps of the process. The moulds are removably attached to a mould carrier which in turn is pivotally attached to a mould-carrier-trolley and by the use of cams or gears the necessary operations such as draining, rocking, etc. performed automatically.

This and the other objects of the invention will be apparent from the following description and in conjunction with the attached drawings wherein:

Fig. 6 illustrates an alternative embodiment of the invention wherein racks and gears are used instead of cams and includes view E, F and G.

Fig. 7 is a top view of the rack and gears illustrated in view F of Fig. 6.

Fig. 8 is a top view of the rack and gears illustrated in view G of Fig. 6.

Fig. 9 includes front views H, J and K of the mould carrying device illustrated in view E, of Fig. 6.

Fig. 10 is a top view of the rack and gears illustrated in view J of Fig. 9.

Fig. 11 is a top view of the rack and gears illustrated in view K of Fig. 9.

Figure 5:
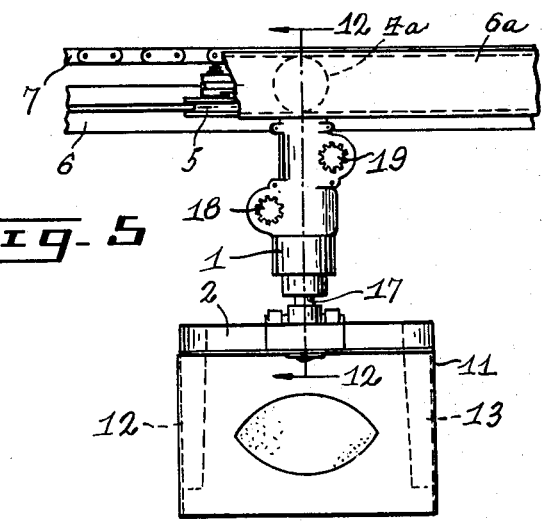
Fig. 5 is a top view of the embodiment illustrated in Fig. 4.

Fig. 12 is a cross-sectional view along line 12—12 of Fig. 5.

Figure 1:
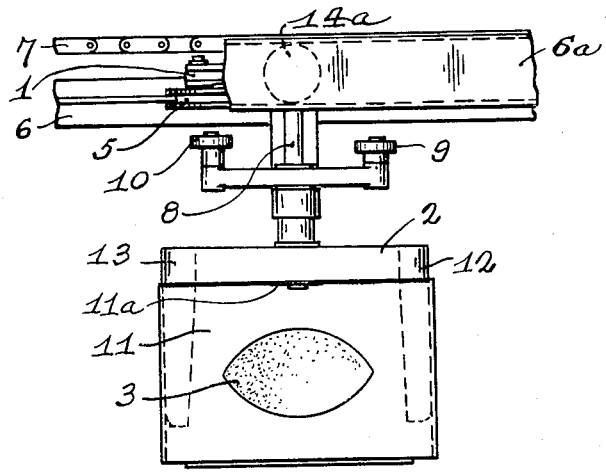
Fig. 1 is a top view of one embodiment of the invention.
Figure 2:
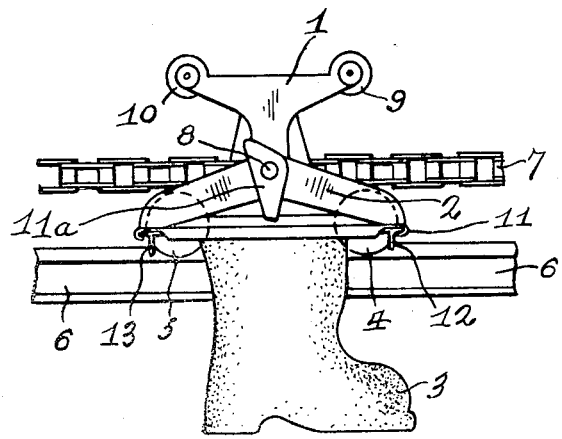
Fig. 2 is a side view of the embodiment illustrated in Fig. 1.

Referring now to the drawings in detail:

In Figures 1 and 2 the mould-carrier-trolley is identified by reference numeral 1, the mould carrier by reference numeral 2 and the mould by numeral 3.

Guide wheel 4A and upper guide track 6A are shown in Fig. 1 only.

The mould-carrier-trolley 1 is fitted with grooved wheels 4 and 5 which run on track 6. Said trolley 1 is pulled by conveyor chain 7.

The mould carrier 2 is pivotally attached to the mould-carrier-trolley 1 at 8. Cam wheels 9 and 10 are provided as shown and their function will be described hereinafter.

The mould 3 is integral with plate 11 and is removably locked to arms 12 and 13 of the mould carrier 2 by a locking device 11A, and thus moulds of different forms or sizes may be quickly interchanged. The invention should not be limited to the method of attachment of the mould to the mould carrier as shown.

Figure 3:
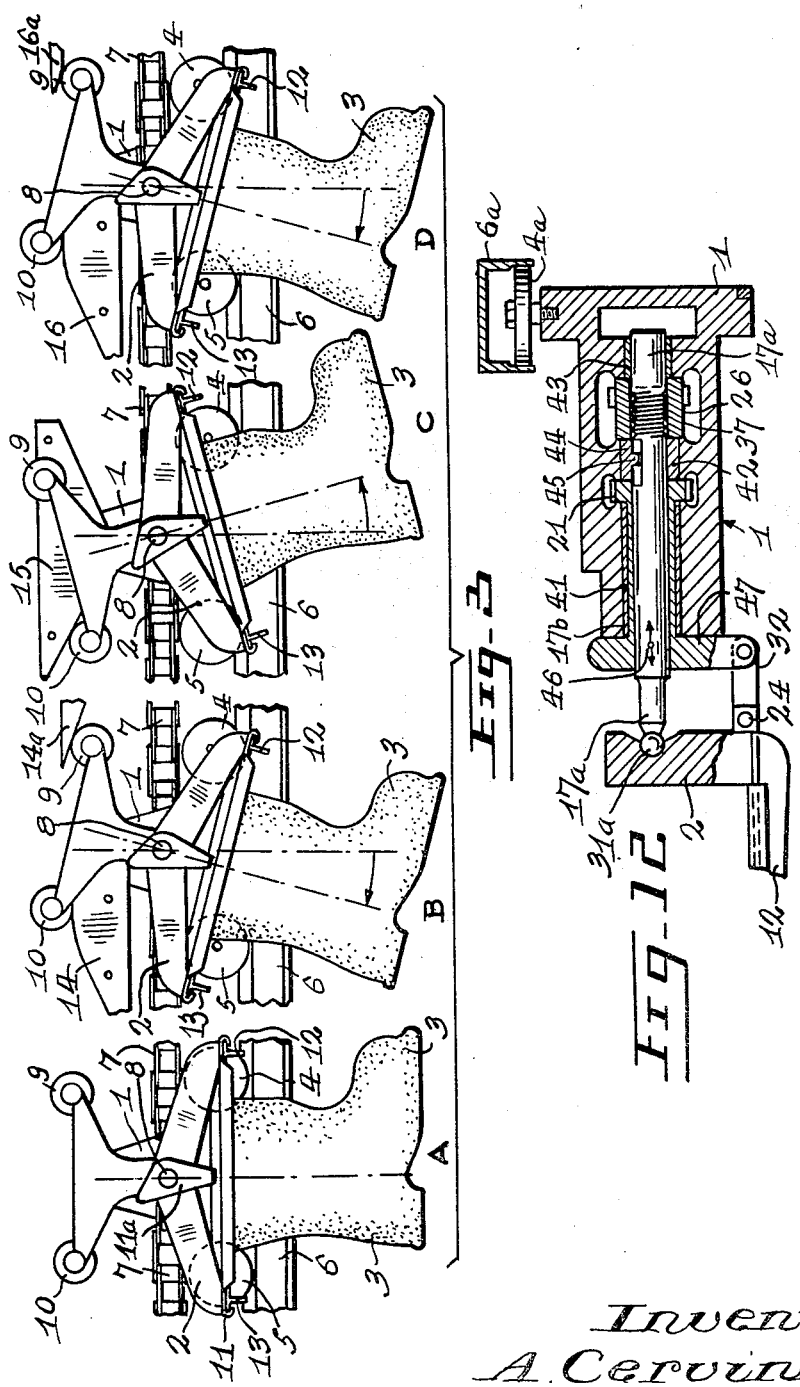
Fig. 3 illustrates an arrangement of cams, for use with the embodiment pictured in Figs. 1 and 2.

In Fig. 3, the mould carrying device corresponding to Fig. 2 is shown a view A. The mould is in a vertical position of 270°.

In view B as the mould-carrier-trolley 1 pulled by conveyor chain 7 rolls along track 6 on grooved wheels 4 and 5, cam wheel 9 passes in front of cam 14 and because of the differences in the planes of the cam wheels 9 and 10, cam wheel 10 makes contact with cam 14. The differences in the planes of cam wheels 9 and 10 are illustrated in Fig. 2. Cam wheel 10 is guided upwardly and forwardly over cam 14 causing the mould carrier 2 and attached mould 3 to pivot at 8 to an angle of less than 270°. As cam wheel 10 leaves cam 14, cam wheel 9 makes contact with cam 14A and rolls downwardly and forwardly along the underside of cam 14A thus further increasing the tilt of the mould.

Because of the elevation of cam wheel 10 by the pivoting action at 8, cam wheel 10 will pass freely above cam 14A and make no contact therewith.

The construction of the pivot at 8 is such that when the mould carrier 2 and attached mould 3 are guided by the cams to a tilted position they will remain in that position until the angle is altered by further cam action.

Continuing along the track, the mould carrier 2 and attached mould 3 are in a tilted position at an angle of less than 270°. Again because of the differences in the planes of cam wheels 9 and 10, cam wheel 9 passes freely in front of cam 15 while cam wheel 10 makes contact therewith as shown in view C. As cam wheel 10 rolls downwardly and forwardly along the underside of cam 15 the pivoting action at 8 causes the tilt of the mould to change from an angle of less than 270° to an angle of more than 270°, also as shown in view C.

As cam wheel 10 leaves cam 15 the mould carrier 2 and attached mould 3 are at an angle of more than 270°. Because of this angle cam wheel 9 is in an elevated position and passes freely over cam 16 (see view D). Cam wheel 10 however makes contact with cam 16 and returns the mould to a vertical position and then to an angle of less than 270° as shown in view D.

As in view B the action of cam 16A on cam wheel 9 increases the angle of tilt still further as shown in view D.

Figure 4:
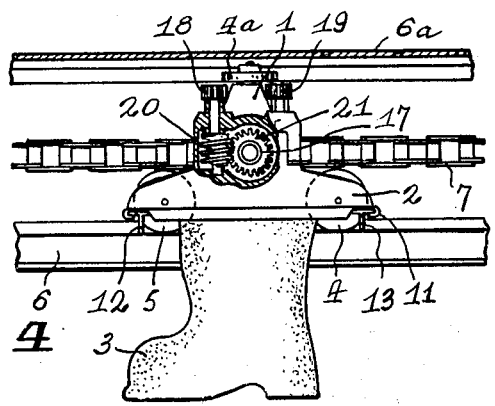
Fig. 4 is a side view of a further embodiment of the invention.

The selection of cams illustrated in Fig. 4 give the mould 3 a gentle rocking action and it will be appreciated that many combinations of cams can be utilized so that the mould can be pivoted to almost any desired angle.

Referring now to Figs. 4 and 5 reference numeral 1 identifies the mould-carrier-trolley, reference numeral 2 the mould-carrier and numeral 3 the mould.

The mould-carrier 2 is fitted with vertical pinion shafts 18 and 19, a helical gear 20 attached to the bottom end of vertical pinion shaft 18 and a horizontal pinion shaft 17 attached to gear 21 are shown in Fig. 4 only. Helical gear 20 meshes with toothed gear 21.

Mould-carrier-trolley 1 is fitted with grooved wheels 4 and 5 which run on track 6. Said trolley 1 is pulled by conveyor chain 7. Guide wheel 4a and upper guide track 6a are shown in Figures 4 and 5. The mould 3 is integral with plate 11 and is removably locked to arms 12 and 13 of the mould carrier 2.

In Figure 6 the mould carrying device corresponding to Figure 4 is shown in view E. As the mould carrier device is pulled along track 6 by conveyor chain 7 pinion shaft 18 contacts rack 22 as shown in view F. The teeth on pinion shaft 18 mesh with the teeth on rack 22 and as the pinion shaft 18 is rolled along the rack 22 a rotational movement is imparted to the said shaft. This rotational movement is transferred to the horizontal pinion shaft 17 by the differential effect of helical gear 20 and gear 21. As the toothed gear 21 is rotated the horizontal pinion shaft 17 simultaneously is rotated. The mould carrier 2 being fixedly attached to the horizontal pinion shaft 17 will hence be pivotally rotated at 17, so that the mould carrier 2 and the mould 3 will be tilted to an angle of more than 270° as shown in view F.

The meshing of the teeth of pinion shaft 18 with rack 22 is shown more clearly in Fig. 7. After pinion shaft 18 is rolled past and out of meshing engagement with rack 22 the mould carrier 2 and mould 3 will remain in a tilted position until altered by further gear action.

Continuing along the track pinion shaft 18 contacts rack 23 as shown in view G. Rack 23 is identical with rack 22 except that it is mounted to engage pinion shaft 18 on the opposite side of rack 22 and thus will impart to pinion shaft 18 a rotational movement in a direction opposite to that of rack 22. This difference in rotational movement is clearly illustrated by arrows 29 and 30 in Figures 7 and 8 respectively. Thus as pinion shaft 18 is rolled along rack 23 as in view G the action of the horizontal pinion shaft on the mould carrier 2 will be reversed from that in view F and the mould 3 will be rotated to an angle of less than 270°.

The arrangement of racks illustrated in Fig. 6 gives the mould a gentle rocking motion and it will be appreciated that by varying the lengths and the positions of the racks the mould may be pivoted to any desired angle.

Reference will now be made to Figures 9, 10 and 11.

Here again the mould-carrier-trolley 1 runs along track 6 on grooved wheel 4 and grooved wheel 5 (not shown). Guide wheel 4A and upper guide track 6A are shonw only in view H. The mould-carrier 2 is pivotally attached at 31 to a horizontal main shaft 17 and is also pivoted at 24 to fixed arm 32.

The mould-carrier-trolley 1 is fitted with a vertical pinion shaft 19 supported in bearing 36. The vertical pinion shaft 19 is provided at its lower end with a helical gear 25. The horizontal main shaft 17 is provided with external helical thread 37 and has been threaded into gear sleeve 26 which has internal helical threads (not shown). The gear sleeve 26 has an external worm gear 38 which meshes with helical gear 25 on the vertical pinion shaft 19. As the mould carrying device rolls along track 6 the threads on vertical pinion shaft 19 contact and mesh with the threads on rack 27. As the pinion shaft 19 is rolled along the rack 27 it receives a rotational movement as shown by arrow 33 in Fig. 10. This rotational movement is transferred down the vertical pinion shaft 19 to the helical gear 25. As the helical gear 25 rotates it cooperates with worm gear 38 to rotate gear sleeve 26. The rotation of the said gear sleeve 26 causes the internal threads of the said gear sleeve 26 to rotate the external helical threads 37 of the main shaft 17. The main shaft 17 is free to move horizontally but the gear sleeve 26 is restrained from horizontal movement. From the relationship of the gears 19, 25, 38 and 37 described above it will be apparent that if the pinion shaft 19 is rotated in the direction of the arrow 33 (see views H and J of Fig. 9, and Fig. 10) that the main shaft 17 will be forced to travel toward the mould carrier 2. Thus by comparing views H and J the mould carrier is pivoted at 24 and 31 by the action of the main shaft 17 as it travels outwardly.

Similarly the mould 3 can be tilted in the opposite direction as shown in view K if the pinion shaft 19 is rotated in the directions of arrows 40 as shown in view K of Fig. 9 and in Figure 11.

It will be appreciated that a reciprocal action can be imparted to the main shaft 17 so that the mould 3 will be rocked from side to side.

The rocking movement described in Figs. 4, 5 and 6 and the rocking movement described in Figs. 9, 10 and 11 can be combined as will be disclosed in reference to the following Fig. 12 which is a cross-sectional view along line (12—12 of Fig. 5) The mould-carrier-trolley 1 is fitted with guide wheel 4a running in upper guide track 6a, main shaft 17a is pivotally attached to mould-carrier 2 at ball-and-socket joint 31a and main shaft sleeve 17b rides in bearing 41 in mould carrier 1. Main shaft 17a is mounted for reciprocal movement indicated by arrow 46 within main shaft sleeve 17b, bearings 42 and 43. Lock groove 44 in main shaft 17a is slidably engaged by lock 45 permitting reciprocal movement of main shaft 17a and preventing rotational movement thereof. Fixed arm 32 is integral with vertical arm 47 of main shaft sleeve 17b and is pivotally attached to mould carrier 2 at 24. Main shaft sleeve 17b terminates in and is integral with toothed gear 21 which is adapted to mesh with helical gear 20 not illustrated in Fig. 12 but which can be seen in Fig. 4. External helical threads 37 on main shaft 17a are in cooperative engagement with the corresponding interior threads of gear sleeve 26. Worm gear 38 on gear sleeve 26 is adapted to cooperate with helical gear 25 not shown in Fig. 12 but illustrated in Fig. 9.

If the helical gear 25 is rotated worm gear 38 and gear sleeve 26 will rotate around the main shaft 17a. Because bearing lock 45 within lock groove 44 on main shaft 17a prevents rotation of the said shaft 17a horizontal movement of the said shaft 17a will result. If the said shaft 17a is forced to travel towards the mould carrier 2 the pivotal action of ball-and-socket joint 31a and bearing 24 will tilt mould carrier arm 12 downwardly. Similarly if main shaft 17a is retracted within the mould-carrier-trolley 1 the pivotal action of ball-and-socket joint 31a and bearing 24 will tilt mould carrier arm 12 upwardly. (See also Fig. 9.)

Rotation of the helical gear 20 illustrated in Fig. 6 which is explained above as meshed with toothed gear 21 of main shaft sleeve 17b, causes the toothed gear 21 and the main shaft sleeve 17b to rotate around main shaft 17a. Vertical arm 47 is integral with main shaft sleeve 17b and is rotated by toothed gear 21. The rotation of horizontal arm 32 which is attached to mould carrier 2 will cause the said mould carrier 2 to rotate on ball-and-socket joint 31a (see Fig. 12 and the description thereof).

The rocking action effected by toothed gear 21, main shaft sleeve 17b, vertical arm 47 and horizontal arm 32, and the tilting action effected by gear sleeve 26 and main shaft 17a can be performed simultaneously as will be apparent.

The descriptions given are for the purpose of illustration only and should in no way limit the scope of the present invention.

I claim:

1. An apparatus for conveying molds in slush molding operations comprising track means, a trolley means mounted for movement along said track means, a mold carrier means pivotally mounted on the trolley means for movement about an axis at least transverse to the track means, actuating means on the carrier means, and further actuating means mounted relative to the track means in predetermined relation thereto cooperable with said actuating means when the trolley means moves along the track means to rock said mold carrier means in one direction about its pivotal mounting for a predetermined distance of travel and thereafter rock the carrier means in the opposite direction.

2. An apparatus for conveying molds in slush molding operations comprising track means, a trolley means mounted for movement along said track means, a mold carrier means, means mounting said carrier means laterally of one side of the track means including means pivotally connecting the carrier means for movement about an axis at least transverse to the track means and complemental actuating means on the mold carrier means and adjacent the track means operative when the trolley means moves along the track means to rock the carrier means in one direction about its pivotal connection for a predetermined distance of travel and thereafter rock the carrier means in the opposite direction.

3. An apparatus as claimed in claim 1, in which the means pivotally mounting the carrier means on the trolley means includes additional means pivotally connecting the carrier means to the trolley means for movement about an axis parallel to the track means.

4. An apparatus as claimed in claim 3, including actuating means on the carrier means operably coupled to said additional pivotal connecting means and further actuating means adjacent the track means cooperable with the last named actuating means to operate the same to move the carrier means about said axis parallel to the track means.

5. An apparatus as claimed in claim 1, in which said actuating means includes cam rollers and the further actuating means includes cam elements.

6. An apparatus for conveying molds in slush molding operations comprising track means, a trolley means mounted for movement along said track means, a carrier means pivotally mounted on the trolley means for movement about an axis at least transverse to the track means, a mold supported by the carrier means, leading and trailing cam rollers on the carrier means located between the mold and the trolley means rotatable about axes transverse to the track means, a plurality of cams fixedly mounted adjacent the track means so shaped and arranged that upon the movement of the trolley means along the track means, the cam rollers coact with the cams to rock the carrier means in one direction about its pivotal mounting for a predetermined distance of travel and thereafter rock the carrier means in the opposite direction for a predetermined distance of travel.

7. An apparatus for conveying molds in slush molding operations comprising track means, a trolley means mounted for movement along said track means, a mold carrier means mounted on the trolley means for pivotal movement about an axis transverse to the track means, a gear means operably coupled to said carrier means, and a plurality of rack means mounted adjacent said track means in predetermined spaced relationship on opposite sides of said gear means and adapted to mesh with said gear means whereby on movement of the trolley means along the track means the gear means meshes with the rack means on one side thereof to turn the carrier means in one direction and when the gear means meshes with the rack means on the other side thereof, the carrier means is turned in the opposite direction.

8. An apparatus for conveying molds in slush molding operations comprising track means, a trolley means mounted for movement along said track means, a carrier means on the trolley means, horizontal shaft means journalled in the carrier means, a mold means secured to the horizontal shaft means, gear means on the horizontal shaft means, a vertical shaft mounted on the carrier means, second gear means mounted on the vertical shaft meshing with said gear means, third gear means on said vertical shaft, and a plurality of rack means mounted adjacent said track means in predetermined spaced relationship on opposite sides of said third gear means and adapted to mesh with said third gear means whereby on movement of the trolley means along the track means the third gear means meshes with the rack means on one side thereof to rotate said second gear and thus the gear means, the horizontal shaft means and mold means in one direction and when said third gear means meshes with the rack means on the other side thereof, said second gear means, horizontal shaft means and mold means are caused to rotate in the opposite direction.

9. An apparatus for conveying molds in slush molding operations comprising track means, a trolley means mounted for movement along said track means, a horizontal shaft mounted in the trolley means for rotary and axial movements, a mold means, means pivotally connecting the mold means to the horizontal shaft for movement about an axis transverse to the track means, means pivotally connecting the mold means to the trolley means for movement about an axis parallel to the track means, a threaded portion on the horizontal shaft, an internally threaded sleeve on the horizontal shaft, an external worm gear on the sleeve, a vertical shaft rotatably mounted on the trolley means, a worm wheel on the shaft meshing with said worm gear, a pinion on said vertical shaft, a second vertical shaft rotatably mounted on the trolley means, a gear on the second vertical shaft, a gear on the horizontal shaft with which said last named gear meshes, a pinion on said second vertical shaft, a plurality of rack means mounted adjacent said track means in predetermined spaced relationship on opposite sides of the pinion on said second vertical shaft, and a plurality of rack means mounted adjacent said track, means in predetermined spaced relationship on opposite sides of the pinion on said first vertical shaft whereby on movement of the trolley means along the track means the meshing of the pinion on the second shaft with the rack means on one side thereof turns the mold means in one direction transverse to the track means while meshing with the rack means on the other side turns the mold means in the opposite direction and the meshing of the pinion on the first vertical shaft with rack means on one side thereof displacing the horizontal shaft axially to move the mold means in one direction about the axis parallel to the track means while meshing with the track means on the other side of such pinion moves the mold means axially in the opposite direction.

References Cited in the file of this patent
UNITED STATES PATENTS

| | | |
|---|---|---|
| 2,456,224 | Sullivan | Dec. 14, 1948 |
| 2,816,643 | Klamp | Dec. 17, 1957 |